US012592977B2

(12) United States Patent
Agarwal et al.

(10) Patent No.: US 12,592,977 B2
(45) Date of Patent: Mar. 31, 2026

(54) SYSTEMS AND METHODS FOR PROVIDING PUSH-TO-TALK SESSION PARTICIPANTS CONTROL OF A PUSH-TO-TALK SESSION

(71) Applicant: ZEBRA TECHNOLOGIES CORPORATION, Lincolnshire, IL (US)

(72) Inventors: Abhineet Agarwal, Bangalore (IN); Santosh Keshari, Bangalore (IN); Vaishali Arora, Bangalore (IN); Mayank Agrawal, Bangalore (IN); Mayank Kumar, Bangalore (IN); Saraju Pradhan, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 100 days.

(21) Appl. No.: 18/755,121

(22) Filed: Jun. 26, 2024

(65) Prior Publication Data
US 2026/0006087 A1     Jan. 1, 2026

(51) Int. Cl.
*H04L 65/4061* (2022.01)
*H04L 65/1093* (2022.01)
*H04L 65/4053* (2022.01)

(52) U.S. Cl.
CPC ...... *H04L 65/4061* (2013.01); *H04L 65/1093* (2013.01); *H04L 65/4053* (2013.01)

(58) Field of Classification Search
CPC ............. H04L 65/4061; H04L 65/1093; H04L 65/4053
USPC ........................................................ 709/238
See application file for complete search history.

(56) References Cited

U.S. PATENT DOCUMENTS

| | | | |
|---|---|---|---|
| 7,398,079 B2 * | 7/2008 | Munje ................... | H04M 1/656 |
| | | | 455/518 |
| 10,555,370 B2 * | 2/2020 | Ayyasamy .......... | H04L 65/4061 |
| 2005/0266869 A1 * | 12/2005 | Jung ....................... | H04W 4/10 |
| | | | 455/518 |
| 2007/0142073 A1 * | 6/2007 | Idnani ................. | H04L 65/1016 |
| | | | 455/518 |
| 2009/0176460 A1 * | 7/2009 | Mienville ........... | H04L 65/4061 |
| | | | 455/90.2 |
| 2011/0092172 A1 * | 4/2011 | Stille ..................... | H04W 76/45 |
| | | | 455/90.2 |
| 2016/0226937 A1 * | 8/2016 | Patel ....................... | H04W 4/10 |

* cited by examiner

*Primary Examiner* — Wing F Chan
*Assistant Examiner* — John Fan

(57) ABSTRACT

Devices, systems and methods for providing push-to-talk (PTT) session participants control of a PTT session are provided. An example method may receive, from at least one computing device of a respective at least one PTT session participant, a control request for control of the PTT session. Providing control based on a control request may include designating the PTT session participant request as a transmitter of communications, and designating remaining PTT session participants as receivers of communications unable to transmit communications. The method may generate a control queue to queue PTT session participants requesting control of the PTT session, adding PTT session participants to the control queue based on when the control request is received. Providing control may include designating the PTT session participant positioned first in the control queue as the transmitter of communications, and removing the PTT session participant positioned first in the control queue from the control queue.

20 Claims, 7 Drawing Sheets

100

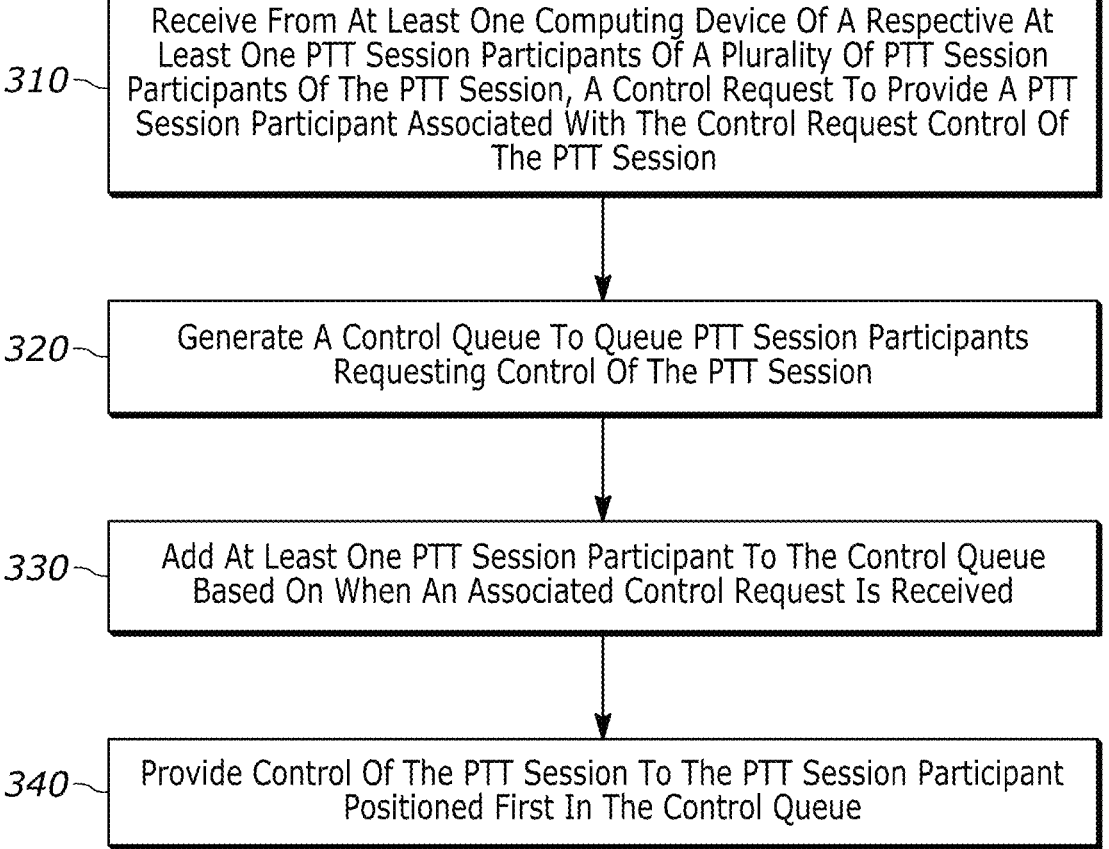

310 — Receive From At Least One Computing Device Of A Respective At Least One PTT Session Participants Of A Plurality Of PTT Session Participants Of The PTT Session, A Control Request To Provide A PTT Session Participant Associated With The Control Request Control Of The PTT Session 320 — Generate A Control Queue To Queue PTT Session Participants Requesting Control Of The PTT Session 330 — Add At Least One PTT Session Participant To The Control Queue Based On When An Associated Control Request Is Received 340 — Provide Control Of The PTT Session To The PTT Session Participant Positioned First In The Control Queue

FIG. 3

SYSTEMS AND METHODS FOR PROVIDING PUSH-TO-TALK SESSION PARTICIPANTS CONTROL OF A PUSH-TO-TALK SESSION

BACKGROUND

Conventional push-to-talk sessions use a half-duplex protocol allowing one session participant (a "speaker") at a time to "take control of the floor" by permitting their user device to transmit audio communications to devices of other call participants ("listeners"). The listeners are relegated to being receivers of the speaker's audio without any ability to transmit audio of their own to anyone else during the session until control of the floor is released by the speaker. Once control of the floor is released by the speaker, generally the session participant that most quickly activates the speaking function on their user device is given control of the floor. In such a push-to-talk communication environment where session participants must vie for control of the floor when it becomes available, there is no guarantee that a session participant can eventually take the floor for speaking despite their best efforts. Even if a listener is able to become the speaker at some point during the session, how long it may take to gain the speaker designation is unknown. Moreover, session participants have no indication of who else in the session is attempting to gain control of the floor. These disadvantages and shortcomings are exacerbated as the number of session participants (e.g., tens or even hundreds) in the session increase. Consequently, a push-to-talk environment created to provide collaborative communications among session participants may frustrate its intended purpose, as it may not be possible or probable for a session participant to contribute to the conversation as speaker in light of the competitive nature in attaining control of the floor.

Accordingly, systems and methods which can provide session participants a measure of awareness and/or control respective to their ability to attain control of the floor during a push-to-talk session may reduce or eliminate the deleterious effects otherwise caused by push-to-talk communication environments.

SUMMARY

In an embodiment, the present disclosure discloses a method for providing push-to-talk (PTT) session participants control of a PTT session including half-duplex protocol. The method may include (i) receiving, from at least one computing device of a respective at least one PTT session participant of a plurality of PTT session participants of the PTT session including the half-duplex protocol, a control request to provide a PTT session participant associated with the control request control of the PTT session by designating the PTT session participant associated with the control request as a transmitter of communications of the PTT session able to transmit the communications to all other PTT session participants, and designating remaining PTT session participants as receivers of the communications unable to transmit any communications to any PTT session participants; (ii) generating a control queue to queue PTT session participants requesting control of the PTT session; (iii) adding at least one PTT session participant to the control queue based on when an associated control request is received, wherein a PTT session participant associated with a first received control request is positioned first in the control queue and a PTT session participant associated with a last received control request is positioned last in the control queue; and (iv) providing control of the PTT session to the PTT session participant positioned first in the control queue including: (a) designating the PTT session participant positioned first in the control queue as the transmitter of the communications, and (b) removing the PTT session participant positioned first in the control queue from the control queue, wherein a PTT session participant positioned next in the control queue after the PTT session participant positioned first in the control queue becomes the PTT session participant positioned first in the control queue.

In a variation of the embodiment, the method may include modifying, by a PTT session participant, an order of the PTT session participants in the control queue; or gaining control, by the PTT session participant, of the PTT session from the PTT session participant designated as the transmitter.

In another variation of the embodiment, modifying the order of the PTT session participants in the control queue may include one or more of: (i) adding a PTT session participant not in the control queue to the control queue; (ii) removing a PTT session participant in the control queue from the control queue; or (iii) reordering one or more PTT session participants in the control queue.

In yet another variation of the embodiment, the PTT session participant may be an initiator of the PTT session.

In still yet another variation of the embodiment, the method may include generating queue data indicating an order of the PTT session participants in the control queue; and transmitting the queue data to the at least one computing device of the respective at least one PTT session participant.

In another variation of the embodiment, the method may include receiving a queue removal request from a computing device of the PTT session participant in the control queue; and responsive to receiving the queue removal request, removing the PTT session participant associated with the queue removal request from the control queue.

In yet another variation of the embodiment, the method may include responsive to the transmitter being redesignated as a receiver of communications, designating the PTT session participant positioned first in the control queue as a new transmitter of the communications.

In still yet another variation of the embodiment, the transmitter being redesignated as the receiver of communications may be based on one or more of: expiration of a timeout period during which the transmitter does not provide the communications; or receiving a relinquish request from a computing device of the transmitter to relinquish a designation as the transmitter.

In another variation of the embodiment, the communications may include audio.

In another embodiment, the present disclosure discloses a system for providing push-to-talk (PTT) session participants control of a PTT session including half-duplex protocol. The system may include one or more processors; and a memory storing instructions that, when executed by the one or more processors, may cause the system to: (i) receive, from at least one computing device of a respective at least one PTT session participant of a plurality of PTT session participants of the PTT session including the half-duplex protocol, a control request to provide a PTT session participant associated with the control request control of the PTT session by designating the PTT session participant associated with the control request as a transmitter of communications of the PTT session able to transmit the communications to all other PTT session participants, and designating remaining PTT session participants as receivers of the communications unable to transmit any communications to any PTT session participants; (ii) generate a control queue to queue PTT session participants requesting control of the PTT session; (iii) add at least one PTT session participant to the control queue based on when an associated control request is received, wherein a PTT session participant associated with a first received control request is positioned first in the control queue and a PTT session participant associated with a last received control request is positioned last in the control queue; and (iv) provide control of the PTT session to the PTT session participant positioned first in the control queue including: (a) designating the PTT session participant positioned first in the control queue as the transmitter of the communications, and (b) removing the PTT session participant positioned first in the control queue from the control queue, wherein a PTT session participant located next in the control queue after the PTT session participant positioned first in the control queue becomes the PTT session participant positioned first in the control queue.

In yet another embodiment, the present disclosure discloses a tangible machine-readable medium comprising instructions that, when executed by one or more processors, cause a machine to at least: (i) receive, from at least one computing device of a respective at least one PTT session participant of a plurality of PTT session participants of a PTT session including half-duplex protocol, a control request to provide a PTT session participant associated with the control request control of the PTT session by designating the PTT session participant associated with the control request as a transmitter of communications of the PTT session able to transmit the communications to all other PTT session participants, and designating remaining PTT session participants as receivers of the communications unable to transmit any communications to any PTT session participants; (ii) generate a control queue to queue PTT session participants requesting control of the PTT session; (iii) add at least one PTT session participant to the control queue based on when an associated control request is received, wherein a PTT session participant associated with a first received control request is positioned first in the control queue and a PTT session participant associated with a last received control request is positioned last in the control queue; and (iv) provide control of the PTT session to the PTT session participant positioned first in the control queue including: (a) designating the PTT session participant positioned first in the control queue as the transmitter of the communications, and (b) removing the PTT session participant positioned first in the control queue from the control queue, wherein a PTT session participant positioned next in the control queue after the PTT session participant positioned first in the control queue becomes the PTT session participant positioned first in the control queue.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3 depicts a flow diagram of an example method for providing PTT session participants control of a PTT session, according to some embodiments.

Figure 1:
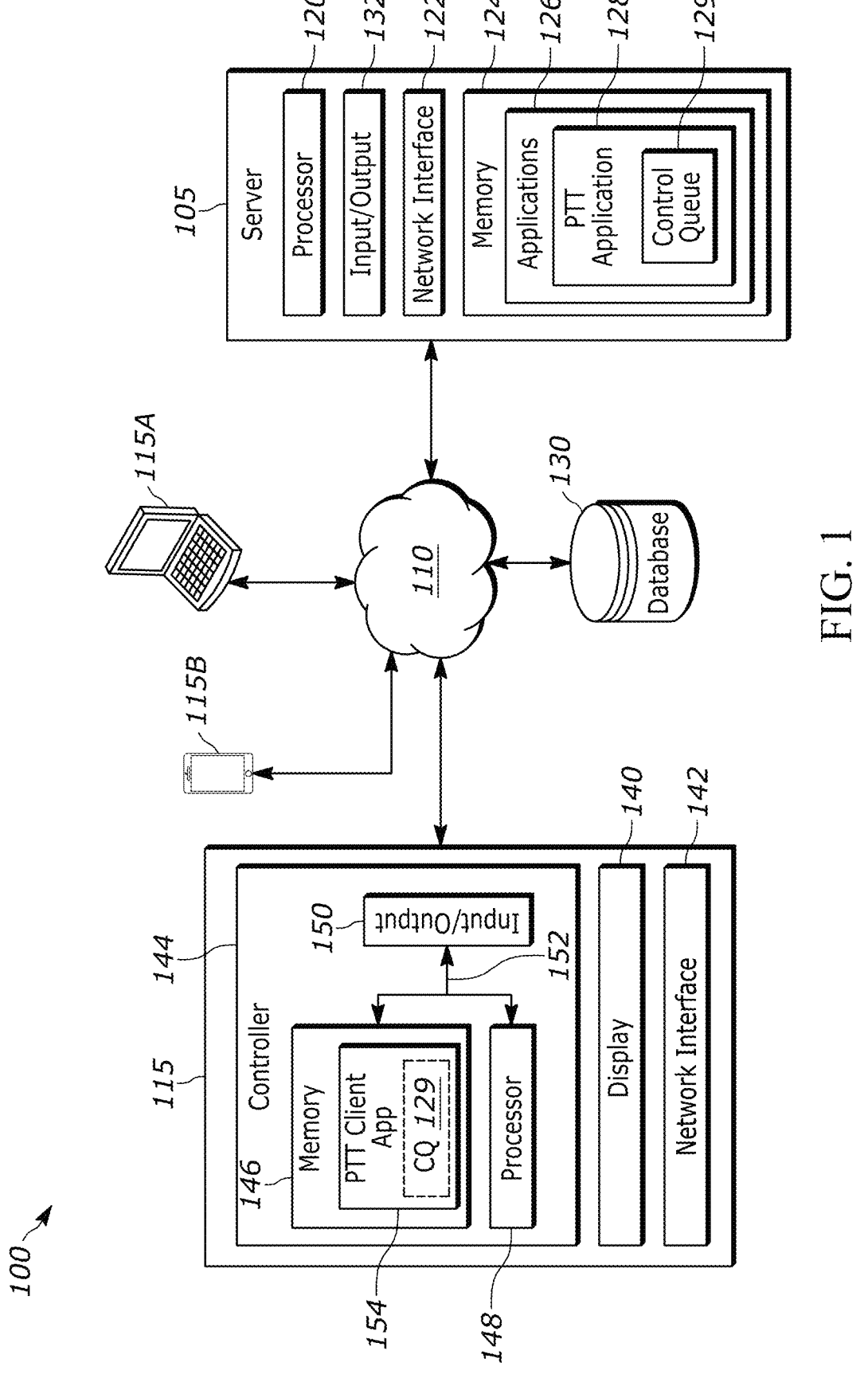
FIG. 1 depicts a block diagram of an example computing environment for providing PTT session participants control of a PTT session, according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The disclosed systems and methods provide push-to-talk (PTT) session participants with control of a PTT session. As used herein, "control" of the PTT session refers to having control of the floor as the speaker and transmitter of communications, as previously described. Each of the terms "controller," "speaker," "transmitter," and the like may be used interchangeably. Similarly, each of the terms "receiver," "listener," and the like may be used interchangeably herein. Moreover, the term "PTT session" may be referred to interchangeably herein as a "PTT call," "a session," "a call," and the like.

A control queue may queue PTT session participants requesting control of the PTT session. A PTT session participant may transmit a control request from their computing device to a server and/or other suitable computing device (herein after server) providing the control queue. The server may generate the control queue, adding the PTT session participants to the control queue based on when their control request is received, such that a PTT session participant associated with a first received control request is added to the control queue and positioned first in the control queue, and a PTT session participant associated with a last received control request is positioned last in the control queue. The PTT session participant positioned first in the control queue is designated as the transmitter of communications (e.g., audio communications) having control of the PTT session, and removed from the control queue. The remaining PTT session participants in the control queue are then moved up in position, for example the PTT session participant positioned second in the control queue is moved into the first position, and so on.

In at least some implementations, the computing devices of one or more PTT session participants receive queue data indicating the order of the PTT session participants in the queue, for example to identify their position and the position of others in the queue to determine when they may take control of the floor. In some implementations, one or more PTT session participants (e.g., the initiator of the PTT session, the transmitter) may have the ability to modify the control queue (e.g., via the control queue on their computing device provided by the queue data) to add one or more PTT session participants to the control queue, remove one or more PTT session participants from the control queue, reorder one or more PTT session participants in the control queue, or any other suitable modifications. In at least some implementations, a PTT session participant may transmit a request to be removed from the control queue to the server via their computing device, and in response be removed from the control queue.

When the transmitter is no longer in control of the floor, for example when giving up control of the floor, leaving the PTT session, being removed due a lack of communication exceeding a threshold amount of time, and/or any other suitable reason, the PTT session participant located first in the queue may be designated as the transmitter. In some implementations, a PTT session participant designated as a listener may take control of the floor from the transmitter, for example when submitting a request to take control of the floor to the server via their computing device.

Unlike conventional push-to-talk sessions, the PTT session participants of the disclosed system and methods do not vie for control of the floor when it becomes available, but rather the control queue is used to provide control of the floor in an organized manner. The disclosed techniques improve conventional PTT sessions, environments, and/or systems via the control queue that indicates which PTT session participant is attempting to gain control of the floor and/or the order of delegation of control of the floor to PTT session participants in the control queue. The control queue may manage any number of PTT session participants (e.g., tens or even hundreds) further mitigating, if not eliminating, the competitive free-for-all that would otherwise occur to gain control of the floor when it becomes available. Thus, PTT communication system components do not waste computing resources (processing cycles, memory, network capacity, power) to generate and/or receive signals when multiple PTT sessions participants attempt to take control of the floor when it becomes available, providing further technical advantages compare to traditional PTT computing environments. Instead, the control queue allows PTT session participants to be added to the control queue based on a single control request, and provides an assurance of eventually becoming speaker. Such improved systems and methods avert the need of the PTT session participant to attempt to gain control of the floor each time it becomes available via their user device, and as a result eliminates the need for the computing device(s) providing the PTT session to be inundated by multiple requests to become speaker when it becomes available, preserving computing resources.

FIG. 1 depicts an example computing environment for providing PTT session participants control of a PTT session, according to some embodiments. The example computing environment 100 may include a server 105, a network 110, a database 130, and user devices 115. Although FIG. 1 depicts certain devices, components, equipment, and devices, it should be appreciated that the computing environment 100 may include additional, fewer, and/or alternate components, and may be configured to perform additional, fewer, or alternate actions, including components and/or actions described herein. For instance, information described as being stored in the database 130 may be stored in memory 124, and therefore the database 130 may be omitted. Moreover, it should be appreciated that additional and/or alternative connections between components depicted in FIG. 1 may be implemented. As just one example, the server 105 and the database 130 may be connected via a direct communication link (not shown in FIG. 1) instead of, or in addition to, via the network 110.

The server 105 may perform the at least some of the functionalities and techniques disclosed herein, such as generating and/or managing a control queue for providing control of a PTT session by session participants. The server 105 may include only one server, or multiple servers that are co-located and/or remotely distributed. The server 105 may be part of a cloud network or may otherwise communicate with other hardware or software components within one or more cloud computing environments to send, retrieve, or otherwise analyze data or information described herein. In some example embodiments, the computing environment 100 comprises an on-premise computing environment, a multi-cloud computing environment, a public cloud computing environment, a private cloud computing environment, and/or a hybrid cloud computing environment.

The example computing environment 100 may include a network 110 comprising any suitable network or combination of networks, such as a local area network (LAN), a wide area network (WAN), the Internet, or a combination thereof. For example, the network 110 may include a wireless cellular network (e.g., 4G, 5G, 6G, etc.). Generally, the network 110 may enable bidirectional communication between the server 105 and/or the user devices 115. In some embodiments, the network 110 comprises a cellular base station, such as cell tower(s), communicating to the one or more other components of the computing environment 100 via wired/wireless communications based upon any one or more of various mobile phone standards, including NMT, GSM, CDMA, UMTS, LTE, 5G, 6G, or the like. Additionally or alternatively, the network 110 may comprise one or more routers, wireless switches, and/or other such wireless nodes communicating with the components of the computing environment 100 via wired and/or wireless communications based upon any one or more of various communications standards, including by non-limiting example, IEEE 802.11a/ac/ax/b/c/g/n (Wi-Fi), Bluetooth, and/or the like.

The example server 105 may include a processor 120. The processor 120 may include one or more processors, such as central processing units (CPUs), graphics processing units (GPUs), and/or any other suitable processor. The processor 120 may be communicatively coupled to the memory 124 via a computer bus (not depicted) to create, read, update, transmit, delete, or otherwise access or interact with the data, data packets, or otherwise electronic signals to and from the processor 120 and the memory 124, e.g., to implement or perform the machine-readable instructions, methods, processes, elements, or limitations, as illustrated, depicted, or described for the various flowcharts, illustrations, diagrams, figures, and/or other disclosure herein. The processor 120 may interface with the memory 124 via a computer bus to execute an operating system and/or computing instructions stored in the memory 124, and/or to access other services/components/etc. For example, the processor 120 may interface with the memory 124 via the computer bus to create, read, update, delete, or otherwise access or interact with the data stored in the memory 124 and/or the database 130.

The server 105 may include a network interface 122 which allows the server 105 to communicate over the network 110 (e.g., with other servers 105, the user devices 115, the database 130) via any suitable wired and/or wireless connection, e.g., using any suitable network interface controller(s) of the network interface 122. The network interface 122 may include one or more transceivers (e.g., wireless WAN (WWAN), wireless LAN (WLAN), and/or wireless personal area network (WPAN) transceivers) functioning in accordance with IEEE reference standards, 3GPP reference standards, and/or other reference standards that may be used in receipt and transmission of data via external/network ports of the server 105 connected to the network 110.

The memory 124 may include one or more memories and/or forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, etc. The memory 124 may store machine-readable instructions executable by the processor 120, including the instructions of one or more application(s) 126. The memory 124 may also store an operating system (e.g., Microsoft Windows, Linux, UNIX, etc.) capable of facilitating the functionalities, applications, methods, or other software of the applications 126 as discussed herein.

In the example embodiment of FIG. 1, the applications 126 include a PTT application 128 providing various functionalities described in further detail below, which may include creating and/or supporting the PTT session, creating and/or managing the PTT session participants, creating and/or managing a control queue 129, etc.

The control queue 129 may be a list, file, and/or other suitable data structure stored in a memory (e.g., the memory 124, the database 130). The PTT application 128, the server 105, the user devices 115 (e.g., via a local copy of the control queue 129) and/or other suitable device, application, and/or component may create and/or manage control queue 129.

The example server 105 may include, and/or have access to (e.g., via network 110), the database 130. The database 130 may include one or more databases that are co-located or remotely distributed. The database 130 may be or include a relational database, such as Oracle, DB2, MySQL, a NoSQL based database, such as MongoDB, or another suitable database. The database 130 may store data and/or datasets including one or more types of data, records, files, etc., such as data associated with PTT session participants (user profiles, contact information), files shared during the PTT session, PTT session logs, and/or other suitable data.

The server 105 may include an input/output (I/O) module 132, comprising a set of computer-executable instructions implementing communication functions. The I/O module 132 may further include or implement an operator interface configured to present information (e.g., the control queue 129) to an administrator or operator and/or receive inputs from the administrator and/or operator. An operator interface may provide a display screen. The I/O module 132 may facilitate I/O components (e.g., ports, capacitive or resistive touch sensitive input panels, keys, buttons, lights, LEDs), which may be directly or indirectly accessible via, or attached to, server 105.

The computing environment 100 may include one or more user devices 115. The user devices 115 may be in communication (e.g., via the network 110) with the server 105, for example to access and/or participate in a PTT session. The user devices 115 may comprise one or more computers and/or multiple, redundant, or replicated client computers accessed by one or more users. The user devices 115 may include one or more computing devices (e.g., a desktop computer, a laptop computer 115A, a terminal), mobile devices (e.g., a smartphone 115B, a tablet), wearables (e.g., a smartwatch, an augmented reality/virtual reality headset), and/or other suitable electronic device. The user device 115 may include a display 140, a network interface 142 (e.g., the network interface 122), and a controller 144. The controller

144 may include a memory 146 (e.g., the memory 124), a processor 148 (e.g., the processor 120), and an I/O module 150 (e.g., the I/O module 132), all of which may be interconnected via an address/data bus 152.

The memory 146 may include an operating system, a plurality of software applications and/or routines, among other things. The memory 146 may include a PTT client application 154, e.g., to provide one or more functionalities associated with a PTT session and/or PTT communications, among others, such as initiating a PTT session, managing the control queue 129, etc. In at least some embodiments, the PTT application 128 may provide at least some of the functionality of the PTT client application 154, for example the server 105 may execute the PTT application 128 to host a PTT session, and the user device 115 may communicatively couple to the server 105 (e.g., via the network 110) to participate in the PTT session using the PTT client application 154.

One of the plurality of applications may be a native application and/or web browser that may be implemented as a series of machine-readable instructions for receiving, interpreting, and/or displaying application screens or web page information from the server 105 while also receiving inputs from the user. Another application of the plurality of applications may include an embedded web browser that may be implemented as a series of machine-readable instructions for receiving, interpreting, and/or displaying web page information. The memory 146 may include data such as application data, routine data for the routines, and/or other data necessary to interact with the server 105 via the network 110. In some embodiments, the controller 144 may also include, or otherwise be communicatively connected to, other data storage mechanisms (e.g., one or more hard disk drives, optical storage drives, solid state storage devices, etc.) that reside within the user device 115.

In at least some embodiments, the server 105 may host a PTT session via a PTT session including a plurality of session participants. The server 105 may initiate a PTT session via the PTT application 128 in response to receiving a PTT session request from the user device 115 executing the PTT client application 154. The PTT session may include multiple PTT session participants accessing the PTT session via respective user devices 115 executing the PTT client application 154. In at least some embodiments, the PTT session may support half-duplex audio communications.

The server 105, via the PTT application 128, may generate and/or manage the control queue 129 of PTT session participants being scheduled to take control of the floor of the PTT session as the transmitter when the role is available. The PTT session participant may be added to the control queue 129 based on a request from the PTT session participant's user device 115 transmits to the server 105 (e.g., via the network 110). In at least some embodiments, a PTT session participant may transmit a control request to be added to the control queue 129 from their user device 115 to the server 105 using the PTT client application 154, for example by selecting a function within the PTT client application 154 to speak and/or to be added to the control queue 129, and/or any other suitable function. In response, the server 105 may add the PTT session participant to the control queue 129. Conversely, a PTT session participant in the control queue 129 may generate and transmit a queue removal request (e.g., via the PTT client application 154) to the server 105 using their user device 115, and in response the server may remove the PTT session participant providing the queue removal request from the control queue 129.

In at least some embodiments, the server 105 may generate queue data indicating an order of the PTT session participants in the control queue 129, and transmit the queue data to the computing devices of the one or more of the PTT session participants, for example for respective user devices to store a local copy of the control queue 129 in the memory 124 to view and/or modify the control queue 129.

In at least some embodiments, the PTT session participants may be added to the control queue 129 in the order in which their control request is received, also referred to as a first-in, first-out (FIFO) queue, wherein the PTT session participant associated with a first received control request is positioned first in the control queue 129 and the PTT session participant associated with a last received control request is positioned last in the control queue 129, although the control queue 129 may include any other suitable type of queue and/or ordering of PTT session participants. During the PTT session, the PTT session participant at the top of the control queue 129 may be designated as the speaker and transmitter of communications, and the remaining PTT session participants may be designated as listeners, such that there is only one speaker/transmitter within a PTT session at one time. The PTT session participant positioned first in the control queue 129 may be removed from the control queue 129 upon being designated as the transmitter. The server 105 may then move the PTT session participant positioned next in the control queue 129, after the PTT session participant that recently became speaker, up one position in the control queue 129 to become positioned first in the control queue 129. The remaining participants in the control queue 129, if any, likewise move up one position in the control queue 129. Upon one or more modifications to the control queue 129, or at any other suitable time, the server 105 may provide updated copies of the control queue 129 (e.g., via control queue data) reflecting the modifications to the computing device 115 of one or more of the PTT session participants.

The PTT session participant presently designated as the transmitter may lose the designation as transmitter during the PTT session. In one example, the PTT session participant designated as the transmitter may not speak and/or otherwise transmit communications during the PTT session for a duration of time configured as a timeout period. Once the timeout period expires without receiving communications from the transmitter, the transmitter may lose control of the floor, and be redesignated from the transmitter to a receiver. In another example, the transmitter may relinquish control of the floor by generating and transmitting a relinquish request from their user device 115 to the server 105 via the network 110, for example by selecting a function within the PTT client application 154 to relinquish control of the floor. In yet another example, the transmitter may lose control of the floor by leaving the PTT session, and/or in any other suitable manner.

In at least some embodiments, one or more PTT session participants may modify the control queue 129, e.g., using a local copy of the control queue 129 stored in the PTT client application 154. Modifying the control queue 129 may include adding a PTT session participant to the control queue 129 that is not present in the control queue 129, removing a PTT session participant in the control queue 129 from the control queue 129, approving and/or denying PTT session participant requests to be added or removed from the control queue 129, reordering one or more PTT session participants in the control queue 129, and/or any other suitable modification of the control queue 129. In response to modifications to the control queue 129, the user device 115 associated with making the modification may generate (e.g., using the PTT client application 154) and transmit (e.g., via the network 110) queue data reflecting the modifications to other PTT session participant user devices 115, to the server 105 (e.g., for the server 105 to relay queue data to the PTT session participant user devices 115), etc. The PTT session participant(s) having the ability to modify the control queue 129 may include the PTT session participant that initiated the PTT session, the PTT session participant presently designated as the transmitter, and/or any other PTT session participant. In some embodiments, a participant not designated as the transmitter may take control of the floor from the presently designated transmitter, for example by generating a request (e.g., a speaker request) using the PTT client application 154, and transmitting the request to the server 105, the user device(s) 115, and/or any other suitable device able to approve the request, or otherwise designate the PTT session participant associate with the control queue request as the transmitter.

Figure 2A:
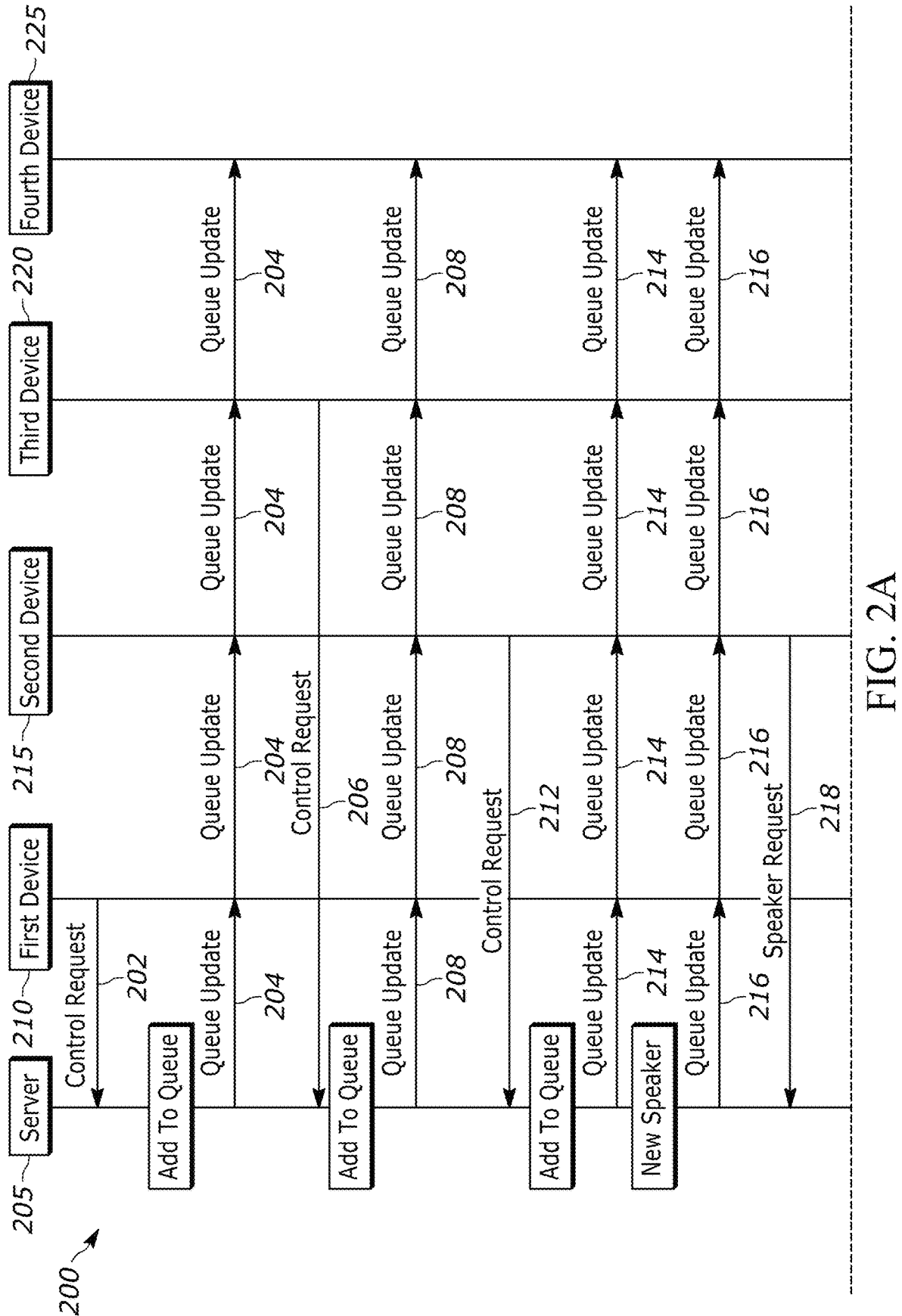
FIG. 2A depicts an example signal diagram for providing PTT session participants control of a PTT session, according to some embodiments.
Figure 2A:
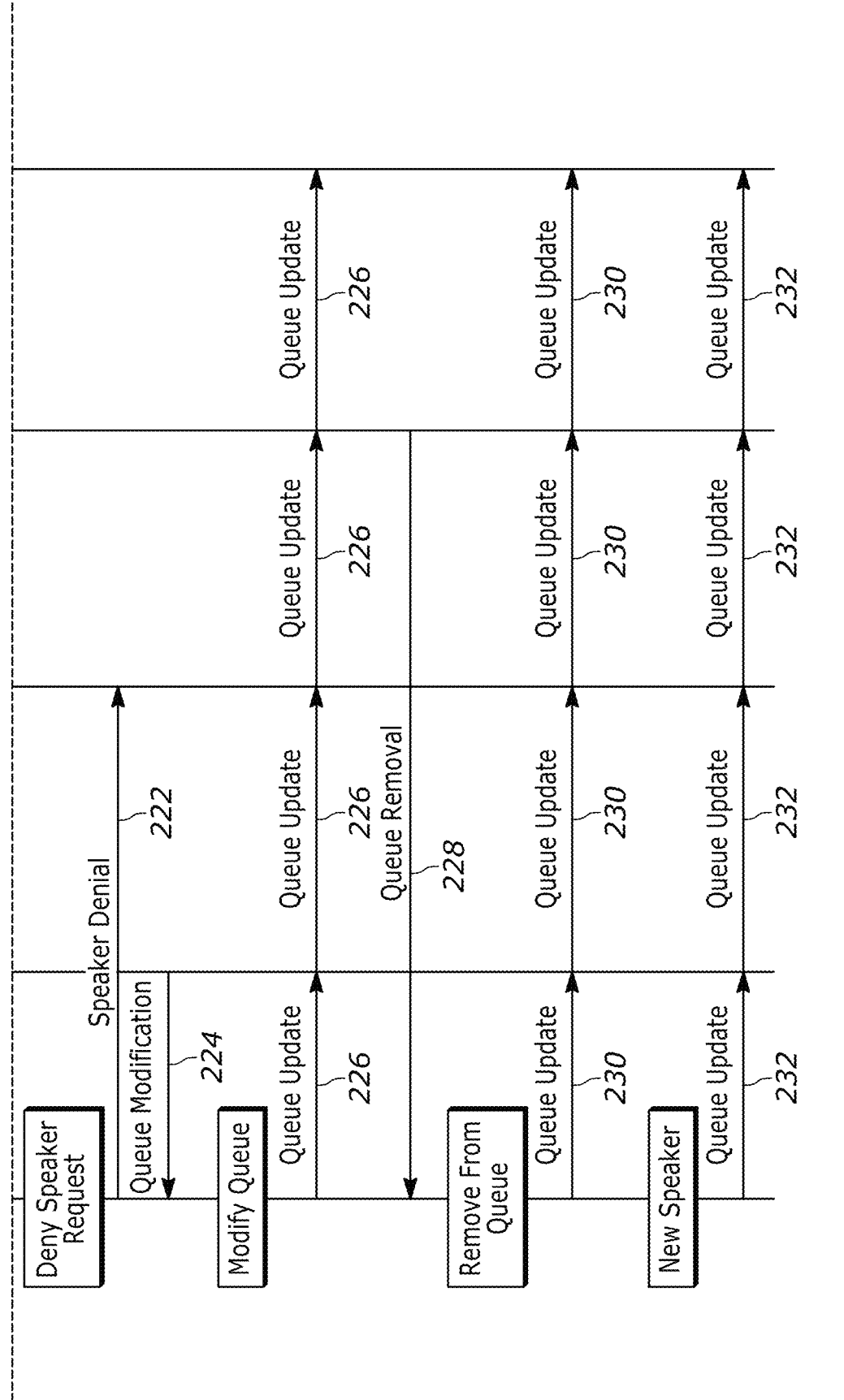

FIG. 2A depicts an example signal diagram 200 for providing push-to-talk (PTT) session participants control of a PTT session, according to some embodiments. It should be understood that the inputs and/or outputs depicted in the signal diagram 200 are for ease of illustration only, and may not represent and/or include every input/output and/or every component associated with the inputs/outputs. Moreover, a signal indicated in the signal diagram 200 as one signal may be comprised of multiple signals. For example, a queue update signal depicted as a single signal may comprise multiple queue update signals each sent to different user devices at the same time, in rapid succession, and the like.

The signal diagram 200 includes a server 205 (e.g., the server 105), a first user device 210, a second user device 215, a third user device 220, and a fourth user device 225 (e.g., the user devices 115) participating in a PTT session. The PTT session may include user devices of other PTT session participants, and/or other suitable devices and/or components, such as those depicted in the computing environment 100.

Once a PTT session is established (e.g., via the server 205 executing the PTT application 128), one or more PTT session participants may request and/or be designated as the transmitter. For example, the user devices 210, 215, 220, 225 may each generate a control request to control the floor of the session. In the example of FIG. 2A, a PTT session participant Adam of the first user device 210 generates a control request 202, and transmits the control request 202 to the server 205. Adam may, for example, push a physical and/or virtual button (e.g., provided via the PTT client application 154) on the first user device 210 to request control of the floor of the PTT session, causing the first user device 210 to generate and transmit the control request 202 to the server 205 (e.g. via the network 110). The control request 202 may include information identifying Adam and/or identifying Adam's user device 210, e.g., for the server 205 to identify the PTT session participant associated with the control request 202 to add to the control queue (e.g., the control queue 129).

Upon receiving the control request 202, the server 205 may generate the control queue, if not in existence already, via the PTT application 128, and add Adam to the top of the control queue in the first position as no other PTT session participants are listed in the generated control queue. In other embodiments, where other PTT session participants are listed in the control queue, the server 105 may add Adam to the last position of the control queue being that his control request 202 is received as the last control request. Adam would remain in the last position of the control queue until a subsequent control request is received, in which case the PTT session participant associated with the subsequent control request would be added as last in the queue after Adam. The server 205 may generate and transmit a queue update 204 (e.g., queue data) to the user devices of the PTT session participants, including the user devices 210, 215, 220, 225, indicating that Adam is now in the control queue. Each of the PTT session participants may store and/or display (e.g., via the PTT client application 154) a copy of the control queue, which is updated accordingly based on receiving queue updates from the server 205 and/or other suitable device. In other embodiments, the server 205 or other suitable device may manage a central control queue, which is accessed by the user devices (e.g., via the network 110) rather than having the user devices store local copies of the control queue, and in such embodiments the central control queue may be updated rather than individual copies of the control queue. However, any suitable manner may be used for managing, modifying, and/or providing access to the control queue.

A PTT session participant Charlie of the third user device 220 may generate and transmit a control request 206 to the server 205, and the server 205 may receive the control request 206 as the next control request after Adam's control request 202. In response, the server 205 may add Charlie to the control queue in the second position, generate a queue update 208 indicating Charlie is added to the control queue, and transmit the queue update 208 to the user devices of the PTT session participants, including the user devices 210, 215, 220, 225, e.g., so the local copies of the control queue provided by the PTT client application 154 may be updated to reflect the changes to the control queue. The user devices of the PTT session participants may update their local copy of the control queue to reflect Charlie being added to the second position of the control queue. Similarly, a PTT session participant Barb of the second user device 215 may generate and transmit a control request 212 to the server 205. In response, the server 205 adds Barb to the control queue in the third position, and generates and transmits a queue update 214 indicating Barb is added to the control queue to the user devices of the PTT session participants, including the user devices 210, 215, 220, 225 (e.g., for updating local copies of the control queue). A fourth PTT session participant Derek of the fourth user device 225 does not wish to be added to the control queue, yet still receives queue updates from the server 205 and is able to view the control queue on his user device (e.g., fourth device 225) via the PTT client application 154 storing a local copy of the control queue 129.

Figure 2B:
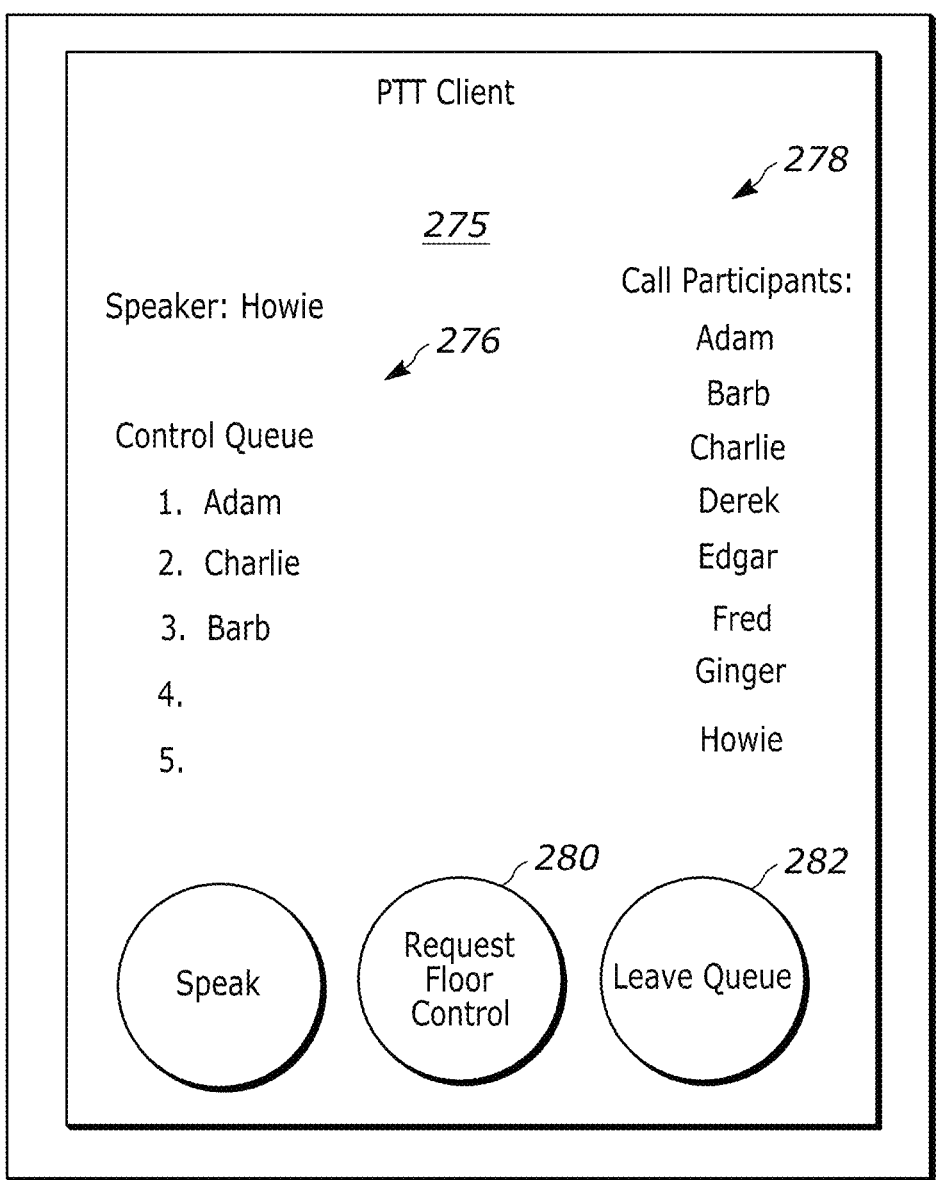
FIG. 2B depicts a first example user interface for providing PTT session participants control of a PTT session, according to some embodiments.

FIG. 2B depicts a first example user interface (UI) 275 for providing PTT session participants control of a PTT session, according to some embodiments. The UI 275 displays the control queue 276, among other things, after the server 205 transmits the queue update 214. In at least some embodiments, the PTT client application 154 on the respective user devices of PTT session participants may generate the UI 275, for example, based at least in part on control queue updates the user devices receive from the server 205. The UI 275 indicates that another session participant Howie is presently the speaker of the PTT session, and includes the control queue 276. The control queue 276 includes Adam in the first position of the control queue 276 in line to be the next speaker (e.g., once Howie is no longer designated as speaker), Charlie next in the control queue in the second position, and Barb last in the queue in the third position. The UI 275 also indicates a list 278 of the current participants in the PTT session.

The PTT client application 154 may provide various functionalities via the UI 275, such as a virtual button 280 for requesting control of the floor, and a virtual button 282 for leaving the control queue, although the PTT client application 154 may provide other suitable functions. In some embodiments, activating a virtual button 280 for requesting control of the floor causes the associated user device to generate and transmit a control request to the server 205. In some embodiments, activating a virtual button 282 for leaving the control queue causes the associated user device to generate and transmit a queue removal request to the server 205.

Returning to FIG. 2A, after Barb is added to the control queue 276, the present speaker Howie relinquishes control of the floor, for example by releasing a physical button on his user device, similar to a walk-talkie button, associated with speaking that was depressed while he remained in control of the floor. The server 205 may use the control queue 276 to designate the session participant listed first in the control queue 276, in this example Adam, as the new speaker. Accordingly, the server 205 designates Adam as the speaker having control of the floor, removes Adam from the control queue 276, promotes Charlie to the first position in the control queue 276 and Barb to the second position in the control queue 276. The server 205 generates a queue update 216 reflecting Adam as the new speaker and the new positions in the queue of Charlie and Barb. The server 205 transmits the queue update 216 to the user devices of the call participants (e.g., the participants listed in the list 278 of current call participants), including user devices 210, 215, 220, 225 (e.g., for updating local copies of the control queue). Although the present example describes the PTT session participant listed in the first position in the control queue as being next in line for control of the floor, it should be understood that the person listed first in the control queue may be the transmitter in control of the floor, and that the PTT session participant in the second position of the control queue may be next in line for control of the floor. In such an embodiment, the transmitter would be removed from the control queue once they are no longer designated as the transmitter.

While Adam is speaking, Barb thinks of an important question she would like Adam to answer, however, Charlie is ahead of Barb in the control queue 276. Barb activates the virtual button 280 to request control of the floor on her second user device 215 in an attempt to ask her question immediately, rather than wait for her turn as speaker based on the control queue 276. In response to activating the virtual button 280, the second user device 215 generates a speaker request 218 for immediate control of the floor, and transmits the speaker request 218 to the server 205. In some embodiments, the server 205 may approve or deny the speaker request 218 (e.g., based on rules and/or settings of the PTT application 128). If denying the speaker request, the server 205 may generate and transmit a denial response to at least the user device associated with the speaker request. If approving the speaker request, the server 205 may designate the associated PTT session participant as speaker, and generate data (e.g., queue data) indicating the change in speaker, and transmit the data to the respective user devices of the PTT session participants. In such an example, the person previously designated as speaker before the speaker request is received may be added to the control queue (e.g., in the first position) or be redesignated as a listener.

In response to Barb's speaker request 218, the server generates and transmits a speaker denial 222 to Barb's second user device 215. In some embodiments, one or more PTT session participants may approve or deny the speaker request 218, for example the PTT session participant having control of the floor or a PTT session participant designated as the manager of the control queue 276. In such embodiments, the second user device 215 may transmit the speaker request 218 to the user devices of the PTT session participants (e.g., via the network 110) having the ability to approve or deny the speaker request 218, and/or transmit the speaker request 218 to the server 205, and in-turn the server 205 may transmit the speaker request 218 to the user devices of the PTT session participants having the ability to approve or deny the speaker request. The speaker request 218 may be approved or denied in any other suitable manner.

In at least some embodiments, one or more PTT session participants may be able to modify the control queue. In the present example, Adam is presently designated as speaker and, as such, has the ability to modify the control queue 276. Adam may be on a team with Barb and Derek and would like them to provide status updates on a team project right after he relinquishes control of the floor. To expedite their responses, Adam modifies the control queue 276 displayed on the first user device 210 via the PTT client application 154 to promote the positions of Barb and Derek to the top of the control queue 276. Using the PTT client application 154, Adam selects Charlie's name in the control queue 276 and demotes Charlie by dragging his name from the first position in the control queue 276 into the empty third position in the control queue 276. Adam selects Barb's name in the second position of the control queue 276 and slides it upward into the first position in the control queue 276. As Derek's name does not yet appear in the control queue 276, to enter Derek's name into the second position in the control queue 276, Adam selects the empty entry in the second position of the control queue 276 previously occupied by Barb's name and selects Derek's name from a list of PTT session participants that appears upon selecting the empty entry in the second position. The process described to make modifications to the control queue 276 is for illustration purposes, and it should be understood that the control queue 276 may be modified using other suitable methods.

Once Adam's modifications to the control queue 276 are complete, Adam's first user device 210 may generate and transmit a queue modification 224 to the server 205 that reflects these changes. However, it should be understood that the first user device 210 (e.g., via the PTT client application 154) may generate and/to transmit data associated with modifying the control queue 276 as each modification is made, and/or in any other suitable manner. Further, in situations when the server 205 maintains a copy of the control queue 276 which the PTT session participants access to modify the control queue 276 (e.g., rather than modifying a local copy of the control queue 276 stored on their user device), the server 205 may monitor the control queue 276 for modifications rather than receive data from the user device modifying the control queue 276 reflecting the modifications. In response to the queue modification 224, the server 205 may generate a queue update 226 reflecting the changes Adam makes to the control queue 276 via the queue modification 224 and transmit the queue update 226 to the user devices of the session participants, including user devices 210, 215, 220, 225 (e.g., for updating local copies of the control queue). In some embodiments, rather than transmitting the queue modifications 224, Adam, via the first user device 210, may transmit the queue modifications 224 and/or generate and transmit a queue update 226 to the user devices of the other PTT session participants reflecting the changes to the control queue 276.

Figure 2C:
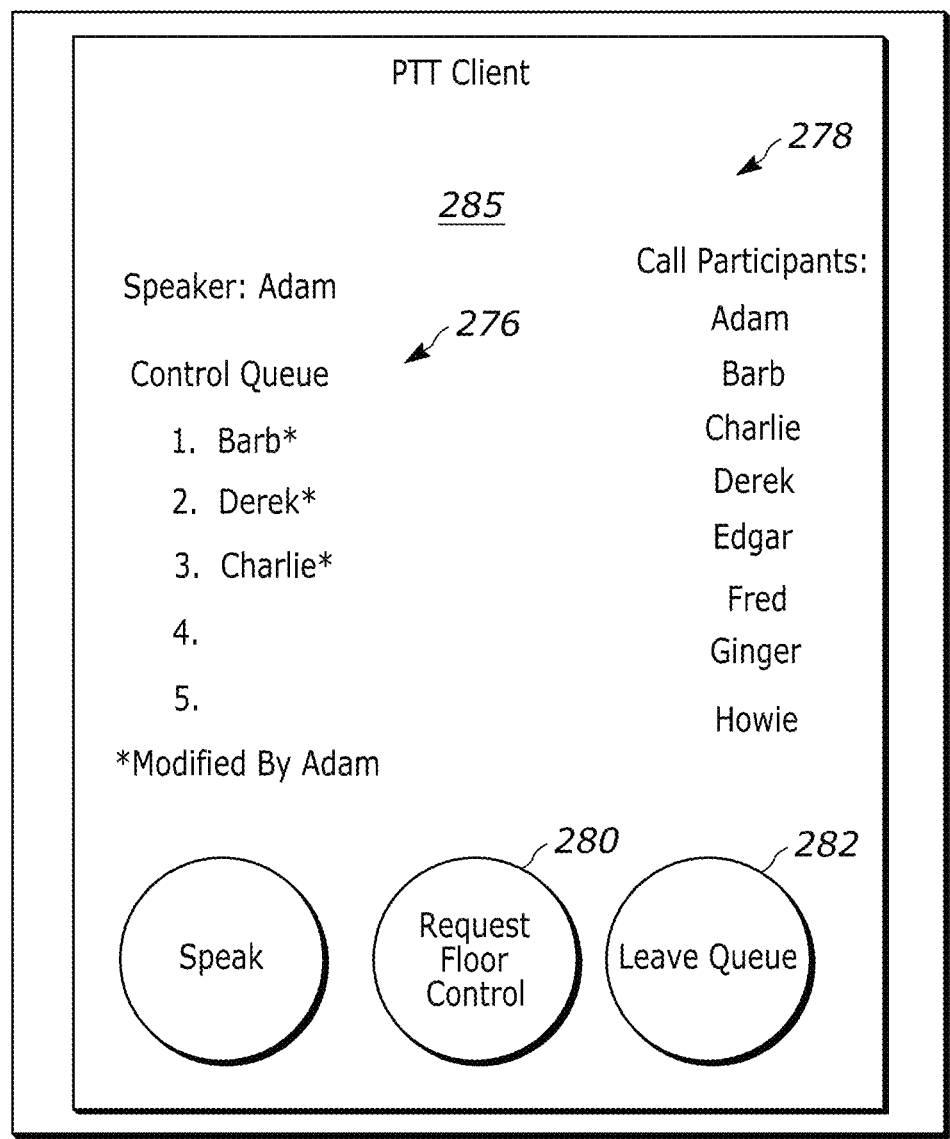
FIG. 2C depicts a second example user interface for providing PTT session participants control of a PTT session, according to some embodiments.

FIG. 2C depicts a second example UI 285 for providing PTT session participants control of a PTT session, according to some embodiments. The UI 285 displays the control queue 276 after the server 205 transmits the queue update 226. As illustrated by FIG. 2C, Adam is listed as the present speaker, and the control queue 276 now lists Barb, Derek, and Charlie, in the first, second, and third positions on the control queue 276, respectively. In at least some embodiments, the control queue 276 may provide an indication that the one of the PTT participants has modified the control queue 276, for example so that other PTT session participants in the session are aware of the cause of the change to the control queue 276. UI 285 provides the indication of modifications using an asterisk next to the names of Barb, Derek, and Charlie in the control queue 276, and further indicates the modifications are made by Adam.

While Charlie is in the control queue 276, Adam answers the question Charlie is planning to ask while Adam is the speaker. Charlie decides he would like to leave the control queue 276 now that his question is answered, and selects the virtual button 282 via the PTT client application 154 of the third user device 220 to leave the control queue 276. In response to activating the virtual button 282, the third user device 220 generates and transmits a queue removal request 228 to the server 205. Responsive to the queue removal request 228, the server 205 generates a queue update 230 indicating that Charlie is no longer in the control queue 276, and transmits the queue update 230 to respective user devices of the session participants, including user devices 210, 215, 220, 225 (e.g., for updating local copies of the control queue).

Adam is also ready to hear from his team members Barb and Derek, and stops transmitting communications to the other session participants. The server 205 is configured with a timeout period, and monitors the amount of time during which no communications are transmitted from the speaker to other PTT session participants. If no communications are transmitted by the speaker between the start and finish of the timeout period, once the timeout period expires the speaker may lose control of the floor by being designated as a receiver of the communications. In the present example, Adam transmits no communication during the timeout period, and once the timeout period expires, the server 205 designates Adam as a listener. The server 205 designates Barb as the new speaker, as she is in the first position of the control queue 276. The server 205 removes Barb from the control queue 276, and promotes Derek from the second position to the first position in the control queue 276. The server 205 generates a queue update 232 reflecting the changes to the designation as speaker and the control queue 276, and transmits the queue update 232 to the respective user devices of the session participants, including user devices 210, 215, 220, 225 (e.g., for updating local copies of the control queue).

Figure 2D:
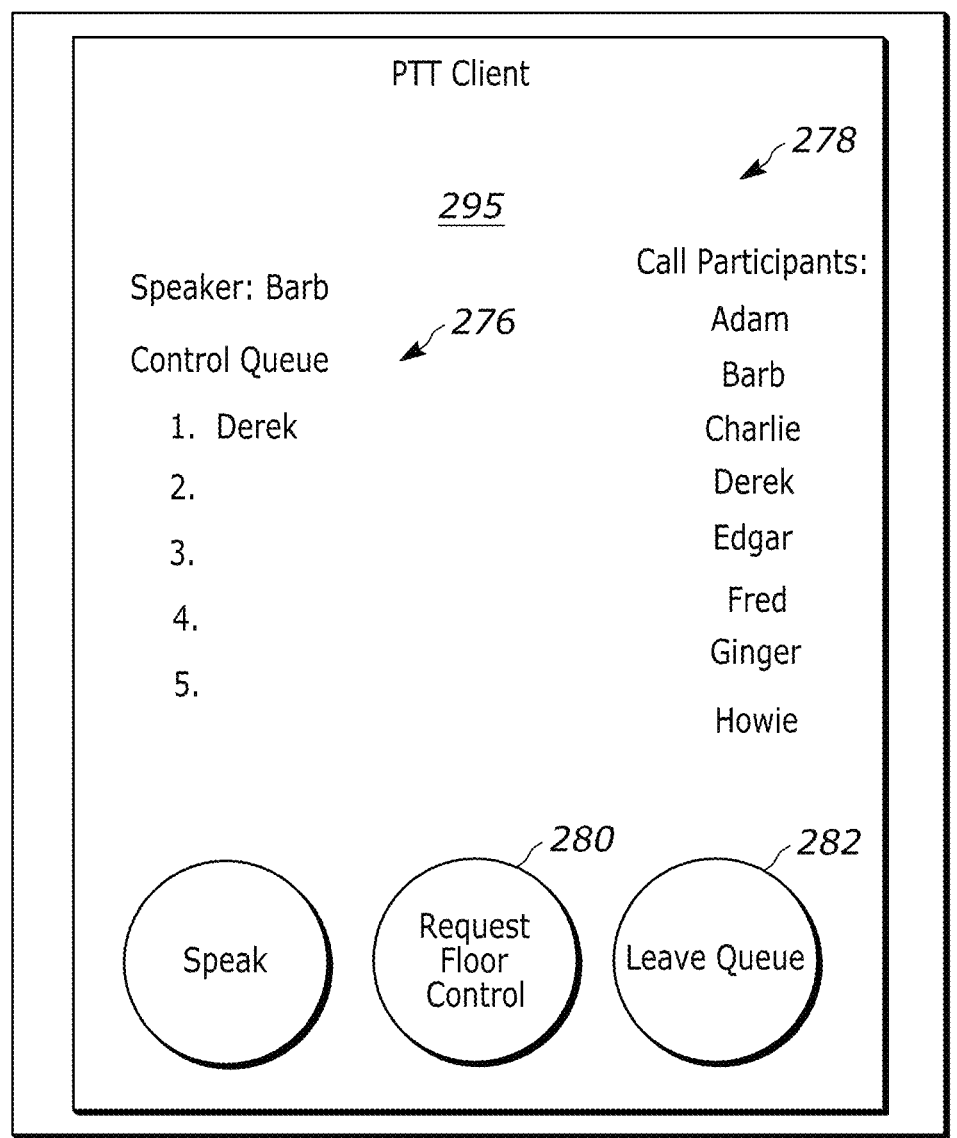
FIG. 2D depicts a third example user interface for providing PTT session participants control of a PTT session, according to some embodiments.

FIG. 2D depicts a third example UI 295 for providing PTT session participants control of a PTT session, according to some embodiments. The UI 295 displays the control queue 276 after the server 205 transmits the queue update 232. The UI 295 indicates that Adam is no longer the speaker but remains in the list 278 of session participants, that Barb is designated as the present speaker, that Charlie is removed from the control queue 276, and the list 278 of the current session participants, and that only Derek remains in the control queue 276 (e.g., in the first position).

The server 205 and/or other suitable device or component may manage the control queue 276 until the PTT session ends, there are no session participants in the control queue 276, one or more users via their user devices take control of the control queue 276, and/or other suitable event and/or reason.

Although FIGS. 2B-2D depicts example UIs 275, 285, 295, it should be appreciated that the server 205 (e.g., via the PTT application 128) and/or user device (e.g., via the PTT client application 154) may generate other configurations of UIs according to the disclosed techniques. Further, while certain devices and/or components are depicted in the FIGS. 2A-2D as providing certain functionalities, it should be understood that additional, fewer, and/or alternate components may be configured to perform additional, fewer, or alternate functionalities. For example, one of the user devices 210, 215, 220, 225 may be configured to manage the control queue 276 instead of, or in addition to, the server 205.

FIG. 3 depicts a flow diagram of an example method 300 for providing PTT session participants control of a PTT session including half-duplex protocol. The method 300 may be performed, for example, by the example computing environment 100, and/or cause devices to generate, transmit, and/or receive signals such as those of the example signal diagram 200. The method 300 may include receiving, from at least one computing device (e.g., the user devices 115, 210, 215, 220) of a respective at least one PTT session participant of a plurality of PTT session participants of the PTT session including the half-duplex protocol, a control request (e.g. the control request 202) to provide a PTT session participant associated with the control request control of the PTT session (block 310). Providing control of the PTT session may include designating the PTT session participant associated with the control request as a transmitter of communications of the PTT session able to transmit the communications to all other PTT session participants, and designating remaining PTT session participants as receivers of the communications unable to transmit any communications to any PTT session participants. In at least some embodiments of the method 300 the communications include audio.

The method 300 may include generating a control queue (e.g., the control queue 276) to queue PTT session participants requesting control of the PTT session (block 320).

The method 300 may include adding at least one PTT session participant to the control queue based on when an associated control request is received (block 330). To add PTT session participants to the control queue, a PTT session participant associated with a first received control request may be positioned first in the control queue, and a PTT session participant associated with a last received control request may be positioned last in the control queue.

The method 300 may include providing control of the PTT session to the PTT session participant positioned first in the control queue (block 340), which may include (i) designating the PTT session participant positioned first in the control queue as the transmitter of the communications, and (ii) removing the PTT session participant positioned first in the control queue from the control queue. The PTT session participant positioned next in the control queue after the PTT session participant positioned first in the control queue may become the PTT session participant positioned first in the control queue. In some embodiments where the control queue includes more than two PTT session participants, the remaining PTT session participants may be moved up in the control queue as well when someone is removed from the control queue, for example being promoted in the control queue by one position.

In at least some embodiments, the method 300 may include (i) modifying, by a PTT session participant, an order of the PTT session participants in the control queue (e.g., via queue modification 224), or (ii) gaining control (e.g., via speaker request 218), by the PTT session participant, of the PTT session from the PTT session participant designated as the transmitter. In some such embodiments of the method 300, modifying the order of the PTT session participants in the control queue may include one or more of: (i) adding a PTT session participant not in the control queue to the control queue; (ii) removing a PTT session participant in the control queue from the control queue; or (iii) reordering one or more PTT session participants in the control queue. In at least some such embodiments of the method 300, the PTT session participant modifying the order of the PTT session participants in the control queue may be the initiator of the PTT session.

In at least some embodiments, the method 300 may include generating queue data (e.g. queue updates 204, 208, 214, 216, 226, 230, 232) indicating an order of the PTT session participants in the control queue, and transmitting the queue data to the at least one computing device of the respective at least one PTT session participant.

In at least some embodiments, the method 300 may include receiving a queue removal request (e.g., the queue removal request 228) from a computing device of the PTT session participant in the control queue, and responsive to receiving the queue removal request, removing the PTT session participant associated with the queue removal request from the control queue.

In at least some embodiments, the method 300 may include, responsive to the transmitter being redesignated as a receiver of communications, designating the PTT session participant positioned first in the control queue as a new transmitter of the communications. In some such embodiments of the method 300, the transmitter being redesignated as the receiver of communications is based on one or more of expiration of a timeout period during which the transmitter does not provide the communications, or receiving a relinquish request from a computing device of the transmitter to relinquish a designation as the transmitter.

It should be understood that not all blocks of the flow diagram of FIG. 3 are required to be performed.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The systems and methods described herein are directed to an improvement to computer functionality, and improve the functioning of conventional computers. Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules include a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

Upon reading this disclosure, those of skill in the art will appreciate still additional alternative structural and functional designs through the principles disclosed herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A method for providing push-to-talk (PTT) session participants control of a PTT session including half-duplex protocol, the method comprising:

receiving, from at least one computing device of a respective at least one PTT session participant of a plurality of PTT session participants of the PTT session including the half-duplex protocol, a control request to provide a PTT session participant associated with the control request control of the PTT session by designating the PTT session participant associated with the control request as a transmitter of communications of the PTT session able to transmit the communications to all other PTT session participants, and designating remaining PTT session participants as receivers of the communications unable to transmit any communications to any PTT session participants;

generating a control queue to queue PTT session participants requesting control of the PTT session;

adding at least one PTT session participant to the control queue based on when an associated control request is received, wherein a PTT session participant associated with a first received control request is positioned first in the control queue and a PTT session participant associated with a last received control request is positioned last in the control queue; and providing control of the PTT session to the PTT session participant positioned first in the control queue including:

designating the PTT session participant positioned first in the control queue as the transmitter of the communications, and removing the PTT session participant positioned first in the control queue from the control queue, wherein a PTT session participant positioned next in the control queue after the PTT session participant positioned first in the control queue becomes the PTT session participant positioned first in the control queue.

2. The method of claim 1, further comprising:

modifying, by a PTT session participant, an order of the PTT session participants in the control queue; or gaining control, by the PTT session participant, of the PTT session from the PTT session participant designated as the transmitter.

3. The method of claim 2, wherein modifying the order of the PTT session participants in the control queue includes one or more of:

adding a PTT session participant not in the control queue to the control queue;

removing a PTT session participant in the control queue from the control queue; or reordering one or more PTT session participants in the control queue.

4. The method of claim 2, wherein the PTT session participant is an initiator of the PTT session.

5. The method of claim 1, further comprising:

generating queue data indicating an order of the PTT session participants in the control queue; and transmitting the queue data to the at least one computing device of the respective at least one PTT session participant.

6. The method of claim 1, further comprising:

receiving a queue removal request from a computing device of the PTT session participant in the control queue; and responsive to receiving the queue removal request, removing the PTT session participant associated with the queue removal request from the control queue.

7. The method of claim 1, further comprising:

responsive to the transmitter being redesignated as a receiver of communications, designating the PTT session participant positioned first in the control queue as a new transmitter of the communications.

8. The method of claim 7, wherein the transmitter being redesignated as the receiver of communications is based on one or more of:

expiration of a timeout period during which the transmitter does not provide the communications; or receiving a relinquish request from a computing device of the transmitter to relinquish a designation as the transmitter.

9. The method of claim 1, wherein the communications include audio.

10. A system for providing push-to-talk (PTT) session participants control of a PTT session including half-duplex protocol, the system comprising:

one or more processors; and a memory storing instructions that, when executed by the one or more processors, causes the system to:

receive, from at least one computing device of a respective at least one PTT session participant of a plurality of PTT session participants of the PTT session including the half-duplex protocol, a control request to provide a PTT session participant associated with the control request control of the PTT session by designating the PTT session participant associated with the control request as a transmitter of communications of the PTT session able to transmit the communications to all other PTT session participants, and designating remaining PTT session participants as receivers of the communications unable to transmit any communications to any PTT session participants;

generate a control queue to queue PTT session participants requesting control of the PTT session;

add at least one PTT session participant to the control queue based on when an associated control request is received, wherein a PTT session participant associated with a first received control request is positioned first in the control queue and a PTT session participant associated with a last received control request is positioned last in the control queue; and provide control of the PTT session to the PTT session participant positioned first in the control queue including:

designating the PTT session participant positioned first in the control queue as the transmitter of the communications, and removing the PTT session participant positioned first in the control queue from the control queue, wherein a PTT session participant located next in the control queue after the PTT session participant positioned first in the control queue becomes the PTT session participant positioned first in the control queue.

11. The system of claim 10, further comprising instructions that, when executed by the one or more processors, cause the system to:

modify, by a PTT session participant, an order of the PTT session participants in the control queue; or gain control, by the PTT session participant, of the PTT session from the PTT session participant designated as the transmitter.

12. The system of claim 11, wherein to modify the order of the PTT session participants in the control queue includes one or more of:

adding a PTT session participant not in the control queue to the control queue;

removing a PTT session participant in the control queue from the control queue; or reordering one or more PTT session participants in the control queue.

13. The system of claim 11, wherein the PTT session participant is an initiator of the PTT session.

14. The system of claim 10, further comprising instructions that, when executed by the one or more processors, cause the system to:

generate queue data indicating an order of the PTT session participants in the control queue; and transmit the queue data to the at least one computing device of the respective at least one PTT session participant.

15. The system of claim 10, further comprising instructions that, when executed by the one or more processors, cause the system to:

receive a queue removal request from a computing device of the PTT session participant in the control queue; and responsive to receiving the queue removal request, remove the PTT session participant associated with the queue removal request from the control queue.

16. The system of claim 10, further comprising instructions that, when executed by the one or more processors, cause the system to:

responsive to the transmitter being redesignated as a receiver of communications, designate the PTT session participant positioned first in the control queue as a new transmitter of the communications.

17. The system of claim 16, wherein the transmitter being redesignated as the receiver of communications is based on one or more of:

expiration of a timeout period during which the transmitter does not provide the communications; or receiving a relinquish request from a computing device of the transmitter to relinquish a designation as the transmitter.

18. The system of claim 10, wherein the communications include audio.

19. A non-transitory machine-readable medium comprising instructions that, when executed by one or more processors, cause a machine to at least:

receive, from at least one computing device of a respective at least one PTT session participant of a plurality of PTT session participants of a PIT session including half-duplex protocol, a control request to provide a PTT session participant associated with the control request control of the PTT session by designating the PTT session participant associated with the control request as a transmitter of communications of the PTT session able to transmit the communications to all other PTT session participants, and designating remaining PTT session participants as receivers of the communications unable to transmit any communications to any PTT session participants;

generate a control queue to queue PTT session participants requesting control of the PTT session; add at least one PTT session participant to the control queue based on when an associated control request is received, wherein a PTT session participant associated with a first received control request is positioned first in the control queue and a PTT session participant associated with a last received control request is positioned last in the control queue; and provide control of the PTT session to the PTT session participant positioned first in the control queue including: designating the PTT session participant positioned first in the control queue as the transmitter of the communications, and removing the PTT session participant positioned first in the control queue from the control queue, wherein a PTT session participant positioned next in the control queue after the PTT session participant positioned first in the control queue becomes the PTT session participant positioned first in the control queue.

20. The non-transitory machine-readable medium of claim 19, further comprising instructions that, when executed by the one or more processors, cause the machine to at least: modify, by a PTT session participant, an order of the PTT session participants in the control queue, or gain control, by the PTT session participant, of the PIT session from the PTT session participant designated as the transmitter.

\* \* \* \* \*